United States Patent Office 3,493,565
Patented Feb. 3, 1970

3,493,565
3-AMINO-5-(NITROFURYL)-1,2,4-OXADIAZOLE DERIVATIVES
Hermann Breuer, Regensburg, Germany, assignor to E. R. Squibb & Sons, Inc., New York, N.Y., a corporation of Delaware
No Drawing. Filed Jan. 24, 1967, Ser. No. 611,234
Claims priority, application Germany, Mar. 14, 1966, 1,670,337
Int. Cl. C07d 85/52
U.S. Cl. 260—240                                    6 Claims

ABSTRACT OF THE DISCLOSURE

This invention relates to new, improved antimicrobial agents of the formula (I)

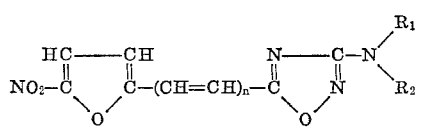

wherein $R_1$ and $R_2$ each represents hydrogen, alkyl, aryl, an aliphatic, aromatic or heterocyclic acyl radical, haloacyl or a substituted or unsubstituted aminoacyl radical, and $n$ is 0, 1 or 2.

---

This invention relates particularly to new compounds of Formula I above wherein $R_1$ and $R_2$ each represents hydrogen, lower alkyl groups of both straight and branched chain structure, including, for example, methyl, ethyl, propyl, isopropyl, butyl, isobutyl, t-butyl, amyl and similar groups; phenyl and simply substituted phenyl such as halophenyl, dihalophenyl, lower alkoxyphenyl, di-lower alkoxyphenyl, lower alkylphenyl, di-lower alkylphenyl and the like; acyl groups including lower alkanol, e.g., acetyl, proprionyl, etc., aroyl, e.g., benzoyl and the like, and monocyclic heterocyclic acyl, e.g., furoyl, morpholinoacetyl, morpholinopropionyl, as well as halogen and nitro-substituted acyl groups of the foregoing type, e.g., chloroacetyl, chloropropionyl, nitrofuroyl, nitrobenzoyl, 4-lower alkylpiperazino-lower alkyl and the like; aminoacyl, like amino-lower alkanoyl, e.g., aminoacetyl; and aminocarbonyl.

Nitrofuran derivatives have been known as antimicrobial agents but it has been found that the particular group of Formula I above show distinct advantages. Especially preferred are the compounds with a free amino group and most especially compounds with a single vinyl bridge (i.e., $n=1$).

The new compounds of this invention show particular advantages as antimicrobial agents ovtr known compounds being useful to combat animal infections due to bacteria and fungi such as Staphylococci, Escherichia, Klebsiella, Candida and Trichophyton, and particularly effective against infections caused by Trichomonas organisms such as *T. vaginalis* and *T. foetus*. They may be used orally in the conventional oral dosage forms in a range of about 10 mg. to 200 mg. per kilogram per day or topically in a cream or ointment vehicle at a concentration of about 0.05 to 2.0%.

The products of Formula I may be produced by one of several methods. A compound of the general formula (II)

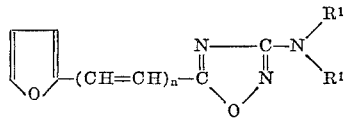

in which $n$, $R_1$ and $R_2$ have the above mentioned meaning, may be nitrated, e.g., with nitric acid. Acylation of the amine group may be simultaneously effected by nitrating in the presence of an acylating agent, e.g., an acid anhydride such as acetic anhydride. Also a haloacyl group may be introduced or a haloacyl group may be converted to aminoacyl group or to an aminocarbonyl group by treatment with an isocyanate.

Alternatively, a compound of the formula

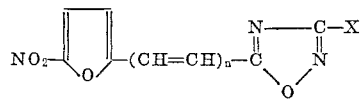

in which $n$ has the same meaning as above and X represents a group which may be replaced by an amine group, e.g., an active halogen such as chlorine, is treated with ammonia or the appropriate amine in an inert organic solvent. During the exchange reaction, additional changes on the amino group or its substituents may be effected.

The following examples are illustrative of the invention, all temperatures are on the centigrade scale.

EXAMPLE 1

To 60 ml. of acetic anhydride are added with stirring and cooling at —15° 24 ml. of nitric acid (d.=1.52). At the same temperature 11.2 grams of 3-acetylamino-5-[2-2-furyl)vinyl]-1-2-4-oxadiazole are added in portions. The substance first goes into solution and then fine crystals precipitate. By the time the last of the compound has been added a thick slurry is formed. The mixture is stirred for an additional 30 minutes, filtered under suction and washed with glacial acetic acid. The yield is 6.0 grams of 3-acetylamino - 5-[2 - (5-nitro-2-furyl)vinyl]-1,2,4-oxadiazole, M.P. 253°, with dec. The substance is recrystallized from glacial acetic acid.

The starting material is prepared by suspending 5.8 grams of 3 - amino - 5-[2-(2-furyl)vinyl-1,2,4-oxadiazole and 3.2 grams of pyridine in 120 ml. of dry chloroform and adding dropwise with stirring 3.2 grams of acetyl chloride. The 3-acetylamino - 5-[2-(2-furyl)vinyl]-1,2,4-oxadiazole crystallizes out, yield 5 grams, M.P. 183–185°.

An additional 1.5 grams of not entirely pure product is obtained from the mother liquor.

EXAMPLE 2

1 gram of 3-acetylamino-5-[2-(5-nitro-2-furyl)vinyl]-1,2,4-oxadiazole is refluxed with 20 ml. of a 10% alcoholic hydrochloric acid solution. The reaction mixture is cooled and the strongly yellow crystals are filtered off under suction. Yield: 0.6 gram 3-amino-5-[2-(5-nitro-2-furyl)vinyl]-1,2,4-oxadiazole, M.P. 232°, with dec.

EXAMPLE 3

11.5 grams of 3-propionylamino-5-[2-(2-furyl)vinyl] (M.P. 178–180°, prepared as described in the same manner as the 3-acetylamino compound in Example 1) is nitrated according to the procedure in Example 1 to obtain 6 grams of 3-propionylamino-5-[2-(5-nitro-2-furyl) vinyl]-1,2,4-oxadiazole, M.P. 202–204°.

EXAMPLE 4

A nitrating mixture is made up from 60 ml. of acetic anhydride, 25 ml. of fuming nitric acid (d.=1.51) and 0.1 gm. of boron trioxide. To this are added 6 grams of 3 - chloroacetyl - amino - 5 - [2 - (2 - furyl)vinyl] - 1, 2,4-oxadiazole at a temperature of —20° C. and the mixture is stirred for an additional 6 hours at this temperature. The yield is 3.2 grams of 3-chloroacetylamino-5-[2-

(5-nitro-2-furyl)vinyl]-1,2,4-oxadiazole. The product is crystallized from glacial acetic acid, M.P. 191–193°.

EXAMPLE 5

Utilizing 7.7 grams of 3-(β-chloropropionylamino)-5-[2-(2-furyl)vinyl]-1,2,4-oxadiazole (M.P. 170–171°, with dec.) in the procedure of Example 4, there are obtained 2.3 grams of 3-(β-chloropropionylamino)-5-[2-(5-nitro-2-furyl)vinyl]-1,2,4-oxadiazole, M.P. 196–197°, with dec.

EXAMPLE 6

To a nitrating mixture consisting of 12 ml. of acetic anhydride, 5 ml. of nitric acid (d.=1.51) and 0.1 gram of boron trioxide are added at −20° two grams of 3-morpholinoacetyl - amino - 5 - [2 - (2 - furyl)vinyl] - 1, 2,4-oxadiazole. The substance goes into solution. The solution is stirred for an additional 20 minutes. The reaction mixture is poured onto 50 grams of ice, diluted with an equal quantity of water and the solution is adjusted to pH 4 with sodium bicarbonate. This is filtered and adjusted to pH 6 with additional sodium bicarbonate. 1.1 grams of 3-morpholino-acetylamino-5-[2-(5-nitro-2-furyl)vinyl]-1,2,4-oxadiazole crystallize, M.P. 164°, with dec. The substance is recrystallized from dioxane and then melts at 166–168°, with dec.

The starting material is prepared as follows: 12 grams of 3 - chloroacetylamino - 5 - [2 - (2 - furyl)vinyl] - 1,2,4-oxadiazole are treated with 70 ml. of tetrahydrofuran and 17 grams of morpholine are added to this mixture all at once. Most of the material goes into solution. After stirring for a short time, a very thick slurry forms which is permitted to stand for an additional day. This is filtered under suction and washed with tetrahydrofuran, practically quantitative yield, M.P. 170–175°.

EXAMPLE 7

30 ml. of acetic anhydride are cooled to −20° and 13 ml. of nitric acid (d.=1.51) are added dropwise. Into the nitrating solution are added at the same temperature 5 grams of 3-(β-morpholinopropionylamino)-5-[2-(2-furyl)vinyl]-1,2,4-oxadiazole. The product goes quickly into solution. After stirring for 30 minutes at −20°, yellow crystals separate, yield 2.7 grams, M.P. 225°, with dec. The mother liquor is poured onto ice. An additional 1.2 grams of product are obtained. Total yield: 3.7 grams of 3 - (β - morpholinopropionylamino) - 5 - [2-(2-furyl)-vinyl]-1,2,4-oxadiazole in the form of the nitric acid salt. By stirring for a while with sodium bicarbonate solution the free base is obtained, M.P. 150–152°.

The starting material is produced as follows:

Into a mixture of 200 ml. of water and 35 grams of morpholine are added 18 grams of 3-β-chloropropionyl-5-[2-(2-furyl)vinyl]-1,2,4-oxadiazole. The mixture is stirred for two hours at 45° and held at 45° (approximately 3 hours) until a sample of the increasingly thicker reaction mixture dissolves clearly in 2 N hydrochloric acid. After cooling, the mixture is filtered under suction. Yield 16 grams of 3-(β-morpholinopropionylamino-5-[2-(2-furyl)vinyl]-1,2,4-oxadiazole, M.P. 176–177°.

EXAMPLE 8

To a nitrating mixture consisting of 15 ml. of acetic anhydride and 8 ml. of nitric acid (d.=1.51) are added 2.5 grams of 3-(N-acetyl)ethylamino-5-[2-(2-furyl) vinyl]-1,2,4-oxadiazole at a temperature of −20°. The reaction mixture is stirred for 30 minutes and then poured onto ice. The viscous light brown mass which separates is washed several times with water and taken up in a small amount of ethanol. After standing in the refrigerator, 0.65 gram of 3-(N-acetyl)ethylamino-5-[2-(5-nitro-2-furyl)vinyl]-1,2,4-oxadiazole crystallizes, M.P. 82–85°. The product is recrystallized from ethanol.

The starting material is produced as follows:

44 grams of 3-acetylamino 5-[2-(2-furyl)vinyl]-1,2,4-oxadiazole are added to 220 ml. of 2 N sodium methylate solution. The mixture is stirred for 1 hour. The methanol is then distilled off in vacuo and the residue is taken up with 300 ml. of distilled dimethylformamide. 78 grams of ethyl iodide are added and the mixture is stirred for 16 hours at room temperature. The clear solution is freed of dimethylformamide in vacuo and treated with water. The pH is adjusted to 7 with dilute hydrochloric acid and the syrup which separates is taken up in ether. The residue is extracted with petroleum ether and recrystallized twice from methanol. The 3-(N-acetyl)-ethylamino-5-[2-(2-furyl)vinyl]-1,2,4-oxadiazole melts at 73–76°.

EXAMPLE 9

To a mixture consisting of 325 ml. of acetic anhydride, 130 ml. of nitric acid (d.=1.51) and 0.7 gram of boron trioxide are added at −20°, 50.7 grams of 3-acetylamino 5-(2-furyl)-1,2,4-oxadiazole. Everything goes into solution upon stirring for 30 minutes. The solution is stirred for an additional 15 minutes at −10° and poured onto ice. The clear solution is adjusted to pH 4 with solid sodium bicarbonate and kept overnight in the refrigerator. After filtering under suction, there are obtained 44.9 grams of 3-acetylamino-5-[5-nitro(2-furyl)]-1,2,4-oxadiazole, M.P. 181–182°, with dec. After recrystallization from dioxane, the substance melts at 182–183°.

The starting material is prepared by acetylating 3-amino-5-(2-furyl)-1,2,4-oxadiazole with acetyl chloride in pyridine, M.P. 151°.

EXAMPLE 10

10 grams of 3-acetylamino-5-[5-nitro-(2-furyl)]-1,2,4-oxadiazole and 200 ml. of a 1% alcoholic hydrochloric acid solution are refluxed for 3 hours. After cooling, the separated crystals are filtered under suction. The mother liquor is concentrated and the residue is crystallized from ethanol. The combined yield is 7.2 grams of 3-amino-5-[5-nitro-(2-furyl)]-1,2,4-oxadiazole, M.P. 200–200°.

EXAMPLE 11

5 grams of 3-(5-nitro-2-furoyl)amino-5-(2-furyl)-1,2,4-oxadiazole (produced from 3-amino-5-(2-furyl)-1,2,4-oxadiazole and 5-nitro-2-furoyl chloride in the presence of pyridine) are nitrated according to the procedure of Example 1 to obtain 3.1 grams of 3-(5-nitro-2-furoyl)amino-5-(5-nitro-2-furyl)-1,2,4-oxadiazole, M.P. 227–229°.

What is claimed is:

1. A compound of the formula

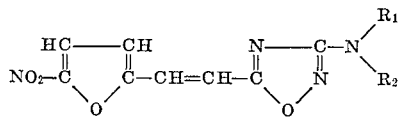

wherein $R_1$ and $R_2$ each is hydrogen, lower alkyl, phenyl, halophenyl, dihalophenyl, lower alkoxyphenyl, di-lower alkoxyphenyl, lower alkylphenyl, di-lower alkylphenyl, lower alkanoyl, halo-lower alkanoyl, or benzoyl.

2. A compound as in claim 1 wherein $R_1$ and $R_2$ are both hydrogen and $n$ is 1.

3. A compound as in claim 1 wherein $R_1$ is hydrogen and $R_2$ is lower alkanoyl.

4. A compound as in claim 1 wherein $R_1$ is hydrogen and $R_2$ is halo-lower alkanoyl.

5. A compound as in claim 1 wherein $R_1$ is hydrogen and $R_2$ is lower alkyl.

6. A compound as in claim 1 wherein $R_1$ is hydrogen, $R_2$ is acetyl and $n$ is 1.

(References on following page)

References Cited

UNITED STATES PATENTS

| | | | |
|---|---|---|---|
| 3,303,188 | 2/1967 | Takai et al. | 260—240 |
| 3,352,683 | 11/1967 | Schmidt et al. | 260—240 |

FOREIGN PATENTS 1,025,439  4/1966  Great Britain.

OTHER REFERENCES

Fujita et al.: J. Pharm. Soc. Japan, vol. 86, pp. 427–432 (1966).

Chemical Abstracts I, vol. 62, cols. 4024–4025 (1965) (abstract of Eloy et al.).

Chemical Abstracts II, vol. 64, cols. 5073–5074 (February 1966) (abstract of Saikawa et al.).

JOHN D. RANDOLPH, Primary Examiner

U.S. Cl. X.R.

424—272, 248; 260—307